(12) United States Patent
Saniga et al.

(10) Patent No.: US 10,951,669 B2
(45) Date of Patent: Mar. 16, 2021

(54) REVERSE CALL FORKING

(71) Applicant: Polycom, Inc., San Jose, CA (US)

(72) Inventors: Jozef Saniga, Zilina (SK); Jeffrey Adams, Lafayette, CO (US); Eric Nylander, Westminster, CO (US)

(73) Assignee: Polycom, Inc., San Jose, CA (US)

( * ) Notice: Subject to any disclaimer, the term of this patent is extended or adjusted under 35 U.S.C. 154(b) by 110 days.

(21) Appl. No.: 15/939,517

(22) Filed: Mar. 29, 2018

(65) Prior Publication Data
US 2018/0288111 A1 Oct. 4, 2018

Related U.S. Application Data

(60) Provisional application No. 62/479,290, filed on Mar. 30, 2017.

(51) Int. Cl.
*H04L 29/06* (2006.01)
*H04L 29/08* (2006.01)
(Continued)

(52) U.S. Cl.
CPC ........ *H04L 65/403* (2013.01); *H04L 65/1083* (2013.01); *H04L 65/605* (2013.01);
(Continued)

(58) Field of Classification Search
CPC . H04L 65/1069; H04L 65/403; H04L 65/605; H04L 65/1083; H04L 67/2823;
(Continued)

(56) References Cited

U.S. PATENT DOCUMENTS

2007/0198698 A1\* 8/2007 Boyd .................. G06F 16/9574
709/224
2015/0003342 A1\* 1/2015 Swaminathan ....... H04W 76/18
370/329
(Continued)

OTHER PUBLICATIONS

Verizon, "Advanced and Customized Net Conference With Cisco WebEx—Dial in User Merge", https://www.mymeetings.com/netconferencing/pdf/dialin_user_merge.pdf, Advanced and Customized Net Conferencing (Year: 2013).\*

(Continued)

*Primary Examiner* — Gregory G Todd
(74) *Attorney, Agent, or Firm* — Keith Lutsch, PC (57) ABSTRACT

A technique for merging conference session dialogs allows presenting content and media streams from a non-Skype endpoint to a Skype multipoint control unit (MCU), so that they present a single caller in a conference with both media and content. A signaling adapter intercepts session dialogs and merges or other modifies. When adding the non-Skype endpoint, requests from a content server are dropped while requests from the MCU handling non-Skype media streams are forwarded to the Skype MCU. Responses to the request from the MCU are also forwarded to the content server. When creating subscription dialogs, requests from the content server are modified to appear as if they came from the MCU, while responses go back to the proper requester. Conference notifications are forked to go to both the content server and the MCU. Because Skype uses separate media and content dialogs, merging of audio/video and content dialogs may be omitted. By merging dialogs, user experience is improved.

20 Claims, 5 Drawing Sheets

(51) Int. Cl.
*H04N 7/15* (2006.01)
*H04M 7/00* (2006.01)

(52) U.S. Cl.
CPC ...... *H04L 67/2823* (2013.01); *H04M 7/0024* (2013.01); *H04N 7/152* (2013.01); *H04L 67/142* (2013.01); *H04L 67/143* (2013.01); *H04L 67/2819* (2013.01)

(58) Field of Classification Search
CPC . H04L 67/2819; H04L 67/143; H04L 67/142; H04N 7/152; H04M 7/0024; H04M 7/0057; H04M 7/0027
See application file for complete search history.

(56) References Cited

U.S. PATENT DOCUMENTS

| | | | |
|---|---|---|---|
| 2015/0011220 A1* | 1/2015 | Buckle | H04W 36/0022 455/436 |
| 2015/0326825 A1* | 11/2015 | Bebbington | H04N 7/152 348/14.09 |
| 2016/0269687 A1* | 9/2016 | Boneh | H04L 12/1813 |
| 2017/0208130 A1* | 7/2017 | Milton | H04L 67/141 |
| 2017/0272512 A1* | 9/2017 | Pai | H04L 67/1002 |

OTHER PUBLICATIONS

Microsoft.com, "Calls, flows, conversations, and MCU sessions", Jul. 27, 2015, https://docs.microsoft.com/en-us/skype-sdk/ucma/calls-flows-conversations-and-mcu-sessions#multiparty-communication, (Year: 2015).*

* cited by examiner

REVERSE CALL FORKING

TECHNICAL FIELD

The present invention relates to the field of videoconferencing, and in particular to a technique for integrating conferencing systems of two different types.

BACKGROUND ART

Enterprises can schedule online conferences using Skype® For Business (formerly known as Lync®) services. (LYNC and SKYPE are registered trademarks of Microsoft Corp.) Some non-Skype videoconferencing systems can connect non-Skype videoconferences with Skype video conferences, but the connection has had limitations. Both Skype endpoints and non-Skype endpoints see content and video from endpoints of the other type as a cascaded videoconference in which the endpoints of the non-Skype videoconference appear in a single segment of a Skype screen layout and endpoints of the Skype videoconference appear in a single segment of a non-Skype screen layout, with a single stream passing between the Skype system and the non-Skype system. This presents a less than optimal user experience.

In addition, current approaches have used a separate server for handling content streams which use its own signaling, resulting in the Skype conference seeing the content as another caller in the Skype conference, which happens to use only content but no audio or video. Thus a single caller from a non-Skype endpoint ends up looking like two callers in the Skype conference.

A better approach to integrating Skype conferences and non-Skype conferences would be desirable.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

Although described herein as a technique for connecting between a Skype conference and non-Skype endpoints, the techniques described below are not so limited, and similar techniques can be used to allow endpoints associated with one type conferencing system to connect to a conference of another type of conferencing system with both media and content in the same conferencing session.

As disclosed herein, the user uses the Microsoft Skype software as the user is accustomed to use it, without any plugins. A user typically schedules an online meeting using the Microsoft Outlook® email software's built-in Skype meeting button. (OUTLOOK is a registered trademark of Microsoft Corporation.) Skype users can join the meeting by clicking the hyperlink they receive in the invitation and be connected to the Microsoft Skype multipoint control unit (MCU), sometimes referred to as an audio video MCU (AVMCU). All that is standard Microsoft flow. Participants with video or audio equipment that cannot dial in to the Skype MCU (referred to herein as a non-Skype endpoint) can dial the conference ID that was sent with the meeting invitation and join a conference on a non-Skype MCU. The non-Skype MCU and a call server enable dialing into the Skype MCU to join the Skype conference. Both Skype endpoints and non-Skype endpoints may see a continuous presence of endpoints that may include Skype endpoints and non-Skype endpoints, as determined by the Skype MCU. Thus, both integration between Skype and non-Skype conferencing systems is provided without requiring installation of a plugin in the non-Skype endpoints.

Figure 1:
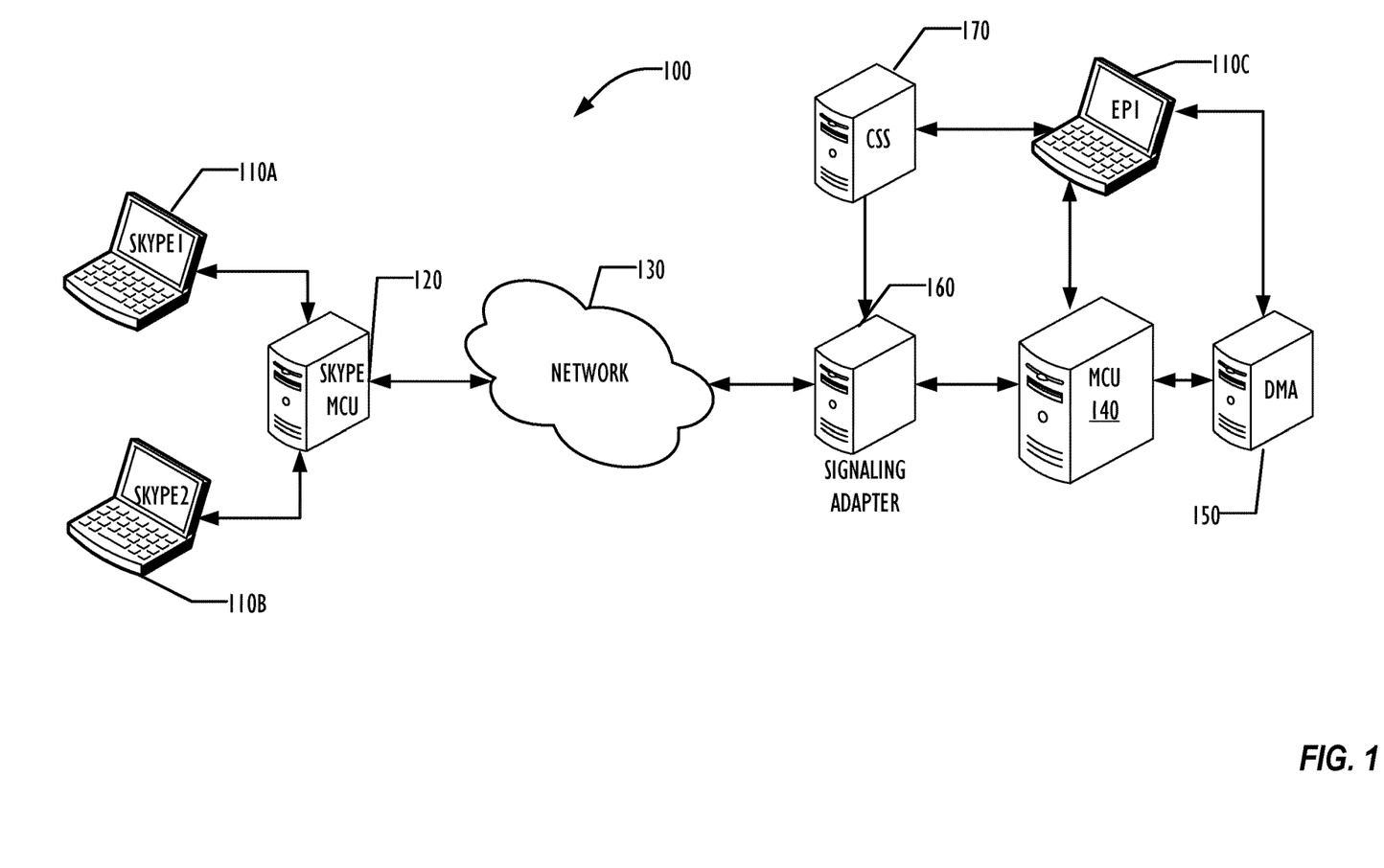
FIG. 1 is a schematic diagram illustrating a system for integrating a Skype endpoint and non-Skype endpoints into an integrated conference according to one embodiment.

FIG. 1 illustrates a system 100 for allowing non-Skype endpoints to connect to a Skype conference according to one embodiment. Although the endpoints 110 are illustrated in the FIG. 1 as laptop computers, they can be any type of programmable device capable of participating in an audio or video conference, including desktop computers, telephones, and mobile devices such as smart phones or tablets. The examples of the Figures are not intended to imply that only those elements shown in the Figures are present. One of skill in the art will also recognize that a Skype system may employ other devices that provide functionality to the Skype system. Similarly, the non-Skype systems illustrated in the Figures may employ other devices than are illustrated in the Figures to provide functionality to the non-Skype system.

A non-Skype call server 150, such as a DMA® call server provided by Polycom, Inc. provides a dial rule using an identification such as "Dial by Skype conference ID." (DMA is a registered trademark of Polycom, Inc.) In this example, endpoint 110C does not support the Skype protocol and is registered to the call server 150, using Session Initiation Protocol (SIP), H.323, or any other Media IP protocol. Details of one embodiment for allowing the non-Skype endpoints 110C to dial in to the conference managed by Skype MCU 120 can be found in U.S. Pat. Pub. No. 20160269687, "Integration of Scheduled Meetings with Audio-Video Solutions," U.S. App. Ser. No. 15/066,498, published Mar. 10, 2016, which is incorporated by reference in its entirety for all purposes. Other techniques may be used to allow non-Skype endpoints to dial in to Skype conferences.

In one embodiment, non-Skype video participants can see one or more Skype participants in a continuous presence layout. In some scenarios, each Skype participant is visible in their own segment of the layout. Likewise, Skype participants may be able to see a presentation of one or more non-Skype participants. In some scenarios, each non-Skype participant is visible in their own segment of the layout. As used herein, a Skype participant refers to an endpoint, such as Skype endpoints 110A and 110B of FIG. 1, that is capable of connecting to the Skype MCU 120 using native protocols. The maximum number of participants that are visible to Skype participants at any time may be constrained by limitations in the Skype MCU 120. In some embodiments, the maximum number of active participants visible to Skype conference participants may be a predetermined number, such as 5.

In the example scenario of FIG. 1, only 3 endpoints are in the conference and the Skype stream limit is 5 streams, thus the Skype MCU 120 may send streams corresponding to all participants to each participant in the conference, including the non-Skype endpoint 110C. In conferences with greater than a Skype MCU 120-determined limit of endpoints, the Skype MCU 120 may only send as many streams as correspond to the limit.

In the discussion below, a signaling adapter merges the audio/video call from MCU 140 with its corresponding content call from a content server (CSS) 170 into a single call from the Skype MCU 130's point of view.

A Skype call consists of multiple SIP dialogs:

(1) A Centralized Conference Control Protocol (CCCP) dialog that is used to add and remove the call from the conference;

(2) A conference info dialog that is used to get info about the conference, its state, its participants and their states;

(3) An audio/video dialog that is used to establish bidirectional flows of audio and video; and (4) A content dialog that is used to establish a flow of shared content.

Not all 4 dialogs exist at all times. For example, if no content is being shared the content dialog may not exist. In another example, when a participant is waiting in the lobby to be admitted into the conference no audio/video dialog may have been created yet.

Call merging happens on 2 different levels. The 2 logical calls (from MCU 140 and the CSS 170) get merged into one call going to Skype servers and some SIP dialogs get merged into one as well.

In FIG. 1, the endpoint 110C sends and receives media streams via MCU 140, which perform transcoding, compositing, and scaling as desired so that the endpoint 110C sees other participants of the Skype conference in a composite continuous presence stream. Content streams from endpoint 110C are delivered via CSS 170. Although illustrated in FIG. 1 as a separate device from MCU 140, functionality of CSS 170 may be implemented in a device that performs both the functions of MCU 140 and CSS 170.

In the example scenario of FIG. 1, the composite stream for endpoint 110C contains segments of streams from Skype endpoints 110A and 110B, as selected for delivery by Skype MCU 120. Endpoint 110C may then display the composite streams on its display, using any predefined layout for the segments, such as in a 2×2 configuration commonly known as a "Hollywood Squares" layout. The layout provided to endpoint 110C may differ from the layout provided to other non-Skype endpoints (not shown in FIG. 1) in some embodiments. Signaling adapter 160 may assist in performing necessary translations from Skype protocols and streams to non-Skype protocols and streams to accomplish this.

In some embodiments, MCU 140 may act as a media relay MCU and instead of composing streams received from Skype MCU 120 into a composite continuous presence stream, may relay the separate streams to endpoints 110C, along with layout-related information, allowing endpoint 110C to build composite images from the relayed streams.

To Skype MCU 120, signaling adapter 160 and MCU 140 are effectively invisible and Skype MCU 120 acts as if it communicates directly with non-Skype endpoint 110C, treating it as a Skype endpoint. In some embodiments, Skype MCU 120 may be unable to detect that non-Skype endpoints are connected to the conference, and may see all endpoints as Skype endpoints, regardless of their true nature.

Endpoint 110C is illustrated in FIG. 1 as if it were directly connected to MCU 140. In practice, endpoint 110C is typically connected to MCU 140 via the Internet or one or more other interconnected networks. Although signaling adapter 160 is illustrated as being implemented in a separate device from MCU 140, signaling adapter 160 may be implemented in a separate environment on the same physical or virtual hardware. Adapting signaling from one protocol to another, such as from SIP to non-SIP protocols or between two SIP variants, is well known in the art and needs no further description herein.

MCU 140 may provide transcoding, compositing, and scaling when acting as an MCU on the incoming streams received from the Skype MCU 120. Transcoding, compositing, and scaling are well known in the art and need no further description herein.

Signaling adapter 160 effectively merges the call for the content and the call for the media generated by endpoint 110C through the CSS 170 and MCU 140 into a single call, so that Skype MCU 120 and Skype endpoints 110A and 110B see only a single caller, with both content and media.

Figure 2:
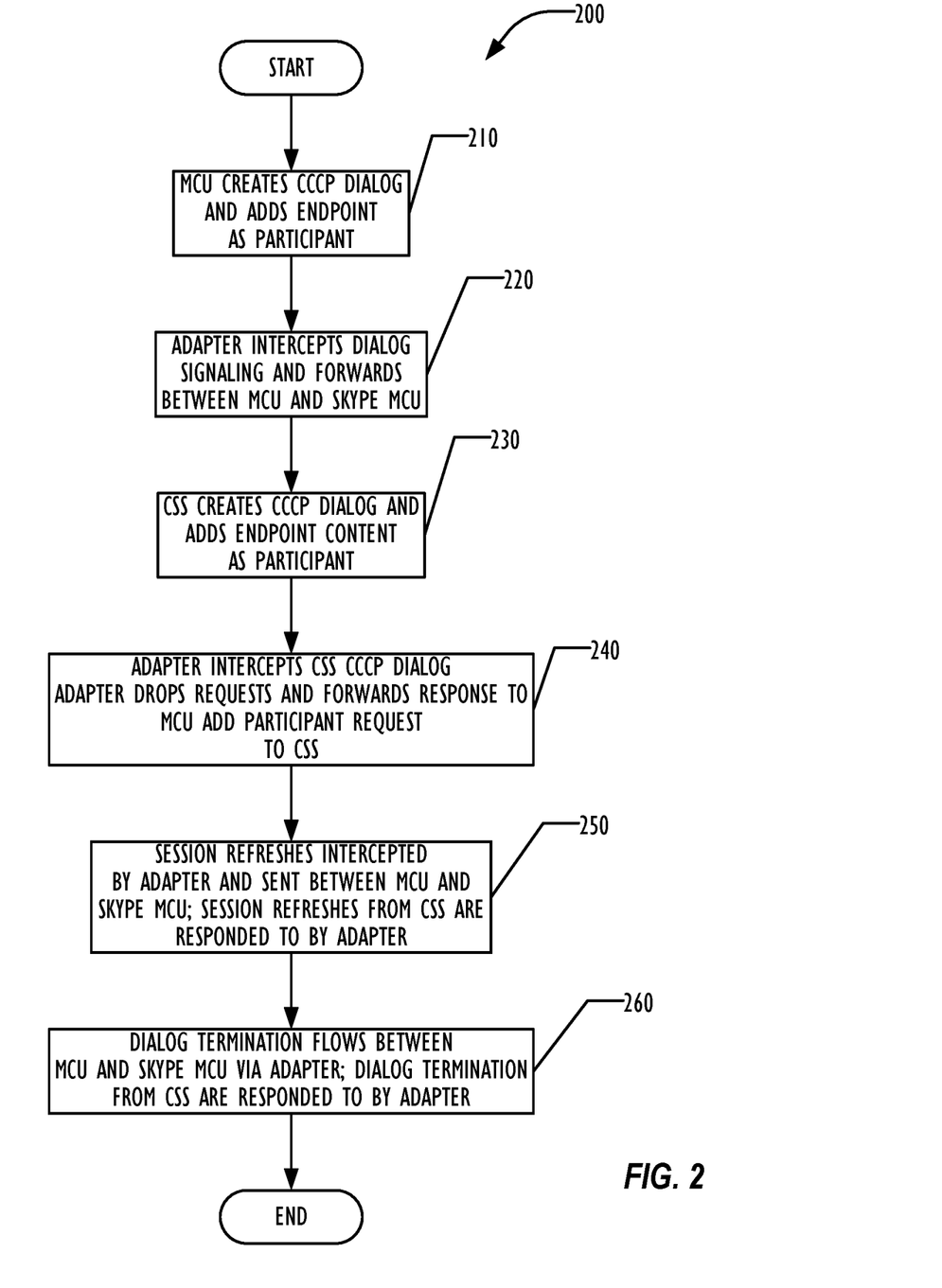
FIG. 2 is a flowchart illustrating a technique for merging media and content sessions add participant and remove participant dialogs for content and media into a single Skype session according to one embodiment.

FIG. 2 is a flowchart illustrating a technique 200 for merging CCCP dialogs of MCU 140 and CSS 170, such as may be performed by signaling adapter 160. No changes are made to the protocol used for CCCP dialog responses or requests. Instead, signaling adapter 160 piggybacks CSS 170's content session into MCU 140's media session.

In block 210, MCU 140 creates a CCCP dialog, and adds endpoint 110C as a participant in the Skype conference. In block 220, signaling adapter 160 intercepts communication between MCU 140 and Skype MCU 120. Signaling adapter 160 forwards requests from MCU 140 to Skype MCU 120 and forwards responses from Skype MCU 120 to MCU 140. Similarly requests from Skype MCU 120 are forwarded by signaling adapter 160 to MCU 140 and responses from MCU 140 are forwarded to Skype MCU 120. This procedure is unchanged from the procedure that would be used without signaling adapter 160.

In block 230, CSS 170 creates a CCCP dialog and adds endpoint 110C as a participant in the Skype conference. Normally, this would create a second caller in the Skype conference. But now, in block 240, signaling adapter 160 intercepts the CSS CCCP dialog. Requests from CSS 170 are not forwarded to Skype MCU 120, but are dropped. Responses that were sent to MCU 140 for adding endpoint 110C as a participant are also forwarded by signaling adapter 160 to CSS 170. Thus, although CSS 170 and MCU 140 both see a CCCP dialog with Skype MCU 120, Skype MCU 120 only sees a single CCCP dialog and thus only a single caller session is created in the conference.

In block 250, session refreshes flow between MCU 140 and Skype MCU 120, with the signaling adapter 160 storing the responses from the Skype MCU 120, but instead of forwarding session refreshes from CSS 170, signaling adapter 160 drops the session refresh from the CSS 170 and responds to the session refresh from the CSS 170 with the MCU sessions responses from the Skype MCU 120.

In block 260, dialog termination is handled similarly to session refreshes. Dialog termination flows between MCU 140 and Skype MCU 120 via signaling adapter 160. But dialog termination requests from CSS 170 are intercepted and responded to by signaling adapter 160, without being forwarded to Skype MCU 120. Because the content call from CSS 170 terminates as soon as the media call from MCU 140 does, signaling adapter 160 may terminate the CCCP dialog for MCU 140 with Skype MCU 120, since signaling adapter 160 knows CSS 170 terminates its CCCP dialog soon afterwards. Otherwise, signaling adapter 160 could not terminate the CCCP dialog with Skype MCU 120 until CSS 170 terminates its CCCP dialog.

Figure 3:
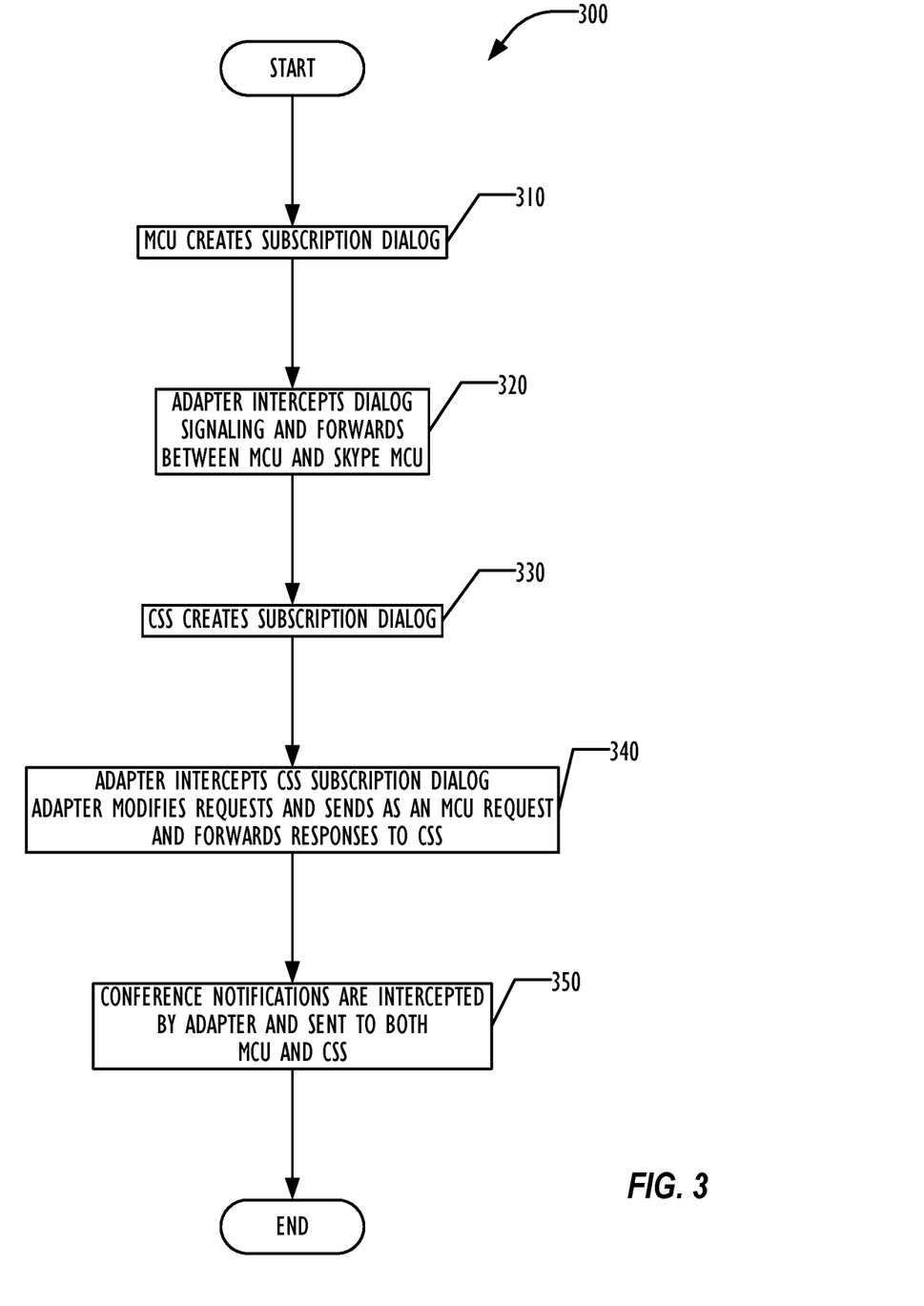
FIG. 3 is a flowchart illustrating a technique for merging media and content sessions conference information dialogs for the single Skype session according to one embodiment.

FIG. 3 is a block diagram illustrating a technique 300 for processing a conference info dialog with Skype MCU 120 according to one embodiment. In block 310, MCU 140 creates a subscription dialog with Skype MCU 120. In block 320, signaling adapter 160 intercepts the requests and responses of the dialog, and forwards the requests and responses to those requests between MCU 140 and Skype MCU 120. When CSS 170 creates a subscription dialog in block 330, signaling adapter 160 then intercepts CSS 170's subscription dialog in block 340. Signaling adapter 160 modifies the requests coming from CSS 170 to appear as if they were coming from MCU 140 before forwarding the requests to Skype MCU 120, as if MCU 140 was making another conference info request. However, upon receiving conference info responses, signaling adapter 160 forwards responses to requests that originated at MCU 140 to MCU 140 and responses to requests that originated at CSS 170 to CSS 170, so each of CSS 170 and MCU 140 get responses to the requests they made. The initial response contains the full conference info, and signaling adapter 160 may thus ask for the full conference info twice.

In an alternate embodiment, signaling adapter 160 may store the full conference info obtained in response to the conference info dialog initiated by MCU 140, store the conference info contained in the response. Instead of modifying the CSS 170 conference dialog request to appear as if the request was coming from MCU 140, signaling adapter 160 may drop the request from CSS 170 and forward the stored conference info response back to CSS 170 as if the stored conference info were coming from Skype MCU 120. However, the previous embodiment is somewhat simpler.

Conference notifications sent by Skype MCU 120 in block 350 are intercepted by signaling adapter 160 and forked to both CSS 170 and MCU 140. Thus, both CSS 170 and MCU 140 get all conference notifications.

In one embodiment, when MCU 140 wants to refresh its conference info dialog, MCU 140 does not send a refresh request, but terminates the original dialog and starts a new conference info dialog. In such an embodiment, because CSS 170 conference info dialog is effectively embedded into MCU 140's conference info dialog, signaling adapter 160 may move CSS 170's conference info dialog from the original MCU 140 conference dialog, so that CSS 170 may continue to receive conference notifications.

In one embodiment, signaling adapter 160 may merge and fork the Session Description Protocol (SDP) messages received from and sent to MCU 140 and CSS 170. The merging may be done on the SDP media line level, adding and removing the SDP media lines associated with CSS 170.

However, in another embodiment, signaling adapter 160 does not need to merge dialogs for audio/video and content, because Skype MCU 120 uses two separate dialogs for media and content. Because CSS 170 passes on only content streams, CSS 170 generates no audio/video dialog. Similarly, because MCU 140 passes on only media streams, MCU 140 generates only an audio/video dialog, not a content dialog. Thus, signaling adapter 160 only needs to make sure that the content dialog generated by CSS 170 is a part of the same logical call from MCU 140 that employs an audio/video dialog.

Figure 4:
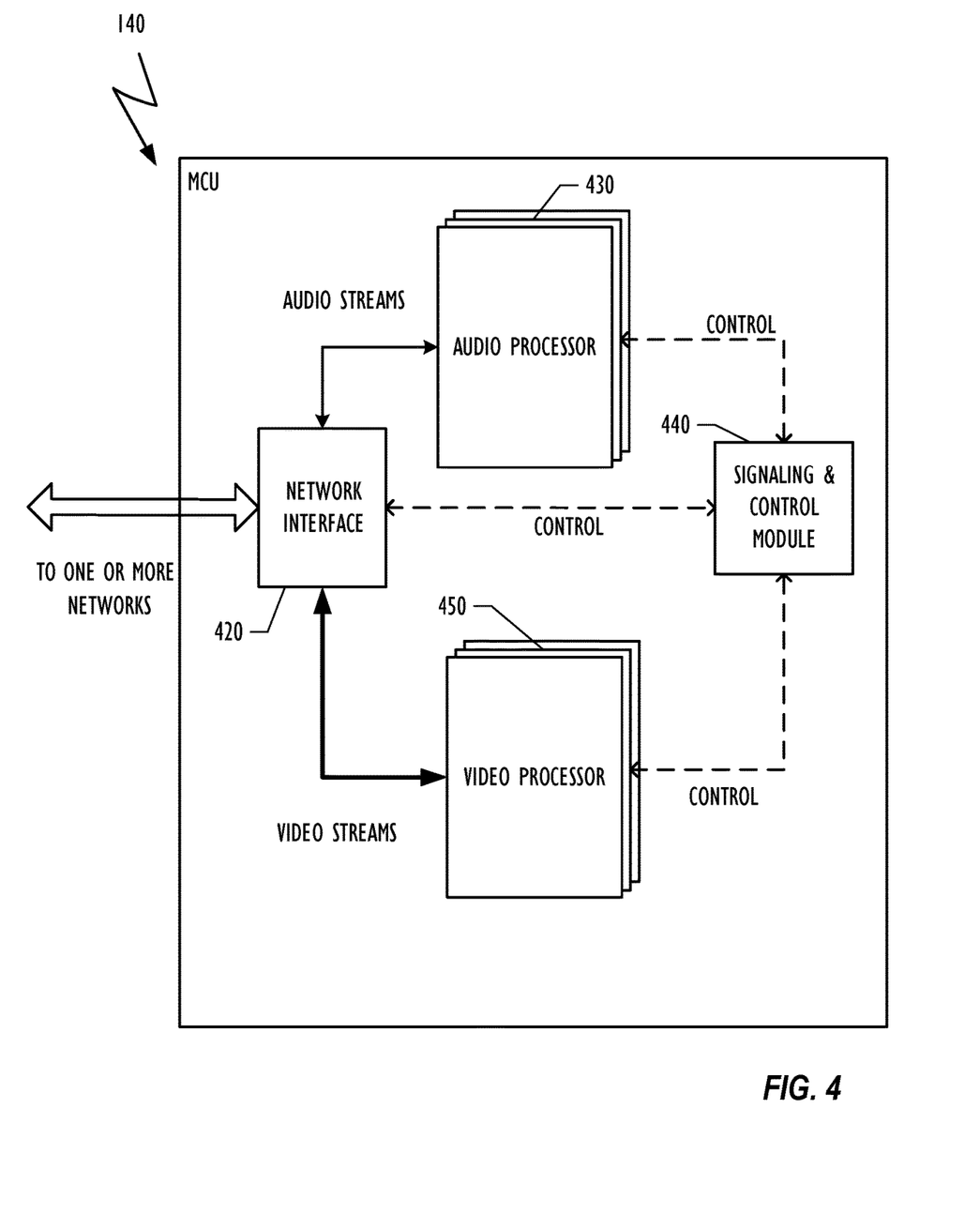
FIG. 4 is a block diagram illustrating a multipoint control unit for use in one embodiment.

FIG. 4 is a block diagram illustrating some relevant components of a non-Skype MCU 140 according to one embodiment. A network interface 420 provides connectivity between MCU 140 and networks such as network 130. One or more audio processors 430 process audio streams received over network interface 420 and audio streams transmitted from MCU 140 over network interface 420. One or more video processors 450 process video streams received and transmitted via network interface 420. Signaling and control module 440 provides control functionality for MCU 140, including handling of dial-out and dial-in functionality that may be used for setting up conferences with endpoints 110 or integrating non-Skype endpoints 110 with Skype conferences hosted by Skype MCU 120.

One of skill in the art will recognize that other elements or components of an MCU that are not illustrated for clarity in FIG. 4 may be deployed in MCU 140 as desired, and that the arrangement and connectivity of FIG. 4 is illustrative and by way of example only. Signaling and control module 440 typically includes one or more processing units that execute instructions stored in a memory, such as a storage device or random access memory, that when executed cause MCU 140 to perform its function.

Figure 5:
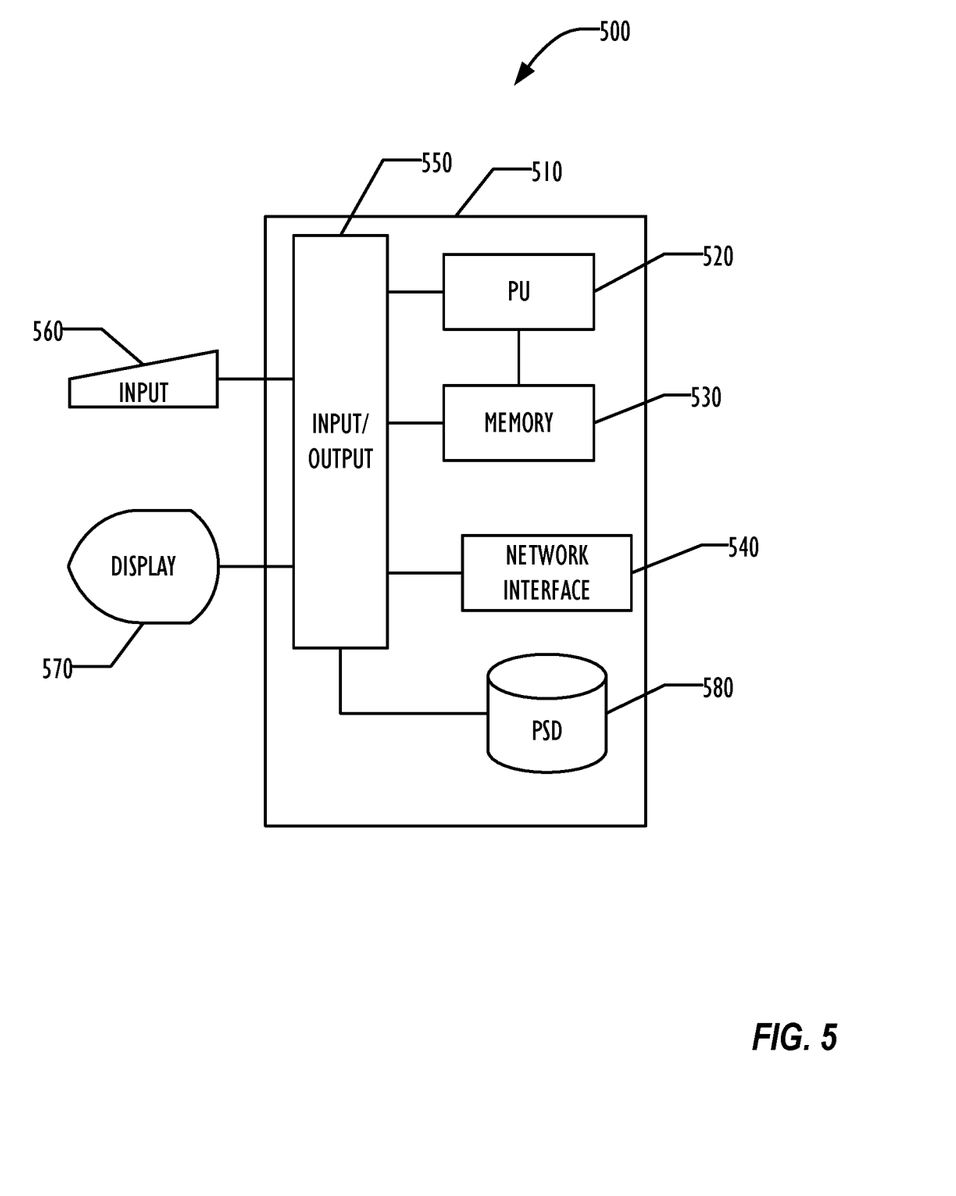
FIG. 5 is a block diagram of a programmable device for use in one embodiment.

FIG. 5 is a block diagram of a programmable device 500 that may be employed as a call server 150, signaling adapter 160, CSS 170, or an endpoint 110 according to one embodiment. Example programmable device 500 comprises a system unit 510 which may be optionally connected to an input device or system 560 (e.g., keyboard, mouse, touch screen, etc.) and display 570. A program storage device (PSD) 580 (sometimes referred to as a hard disc) is included with the system unit 510. Also included with system unit 510 is a network interface 540 for communication via a network with other computing and networking devices (not shown). System unit 510 may be communicatively coupled to network interface 540. Program storage device 580 represents any form of non-volatile storage including, but not limited to, all forms of optical and magnetic, including solid-state, storage elements, including removable media, and may be included within system unit 510 or be external to system unit 510. Program storage device 580 may be used for storage of software to control system unit 510, data for use by the programmable device 500, or both.

System unit 510 may be programmed to perform methods in accordance with this disclosure. System unit 510 comprises a processing element (PU) 520, input-output (I/O) interface 550 and memory 530. Processing element 520 may include any programmable controller device including one or more members of the processor families in common use in computers, including multi-core processors. Memory 530 may include one or more memory modules and comprise any type of memory, including, but not limited to, random access memory (RAM), read only memory (ROM), programmable read only memory (PROM), programmable read-write memory, and solid-state memory. One of ordinary skill in the art will also recognize that PU 520 may also include some internal memory including, for example, cache memory. Program storage device 580 has stored on it instructions that when executed cause the programmable device 500 to perform its function.

Because prior approaches to integrating non-Skype endpoints into a Skype conference resulted in separate calls appearing for content and media from a non-Skype endpoint, the content and media from a non-Skype participant in the Skype conference could not recognized as connected by Skype MCU 120. Advantageously in embodiments described above, each non-Skype participant appears with media and content linked, and can be controlled as a single caller, instead of two separate callers.

Embodiments may be implemented in one or a combination of hardware, firmware, and software. Embodiments may also be implemented as instructions stored on a machine readable storage medium, which may be read and executed by at least one processing element to perform the operations described herein. A machine readable storage medium may include any non-transitory mechanism for storing information in a form readable by a machine (e.g., a computer). For example, a machine readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A conferencing method for connecting endpoints of one type to a conference of another type, comprising:
   receiving, from a first multipoint control unit of a first type by a signaling adapter, a first request being sent to a second multipoint control unit of a second type to add a participant for a media stream;
   sending, by the signaling adapter, the received first request to the second multipoint control unit;
   receiving, from a content server by the signaling adapter, a second request being sent to the second multipoint control unit to add the participant for a content stream;
   dropping the second request by the signaling adapter;
   receiving, from the second multipoint control unit by the signaling adapter, responses to the first request; and sending received responses to the first request, by the signaling adapter, to the first multipoint control unit and the content server.

2. The conferencing method of claim 1, wherein the media stream and the content stream originate from a single endpoint of the first type.

3. The conferencing method of claim 1, further comprising:
receiving, from the first multipoint control unit by the signaling adapter, a first session refresh request being sent to the second multipoint control unit;
sending, by the signaling adapter, the received first session refresh request to the second multipoint control unit;
receiving, from the second multipoint control unit by the signaling adapter, a response to the first session refresh request;
sending, by the signaling adapter, the received response to the first session refresh request to the first multipoint control unit;
storing, by the signaling adapter, the received response to the first session refresh request;
receiving, from the content server by the signaling adapter, a second session refresh request being sent to the second multipoint control unit;
dropping, by the signaling adapter, the second session refresh request; and
responding, by the signaling adapter, to the second session refresh request with the stored response to the first session refresh request.

4. The conferencing method of claim 1, further comprising:
intercepting, by the signaling adapter, a first subscription dialog for conference information between the first multipoint control unit and the second multipoint control unit;
forwarding, by the signaling adapter, the intercepted first subscription dialog for conference information between the first multipoint control unit and the second multipoint control unit;
intercepting, by the signaling adapter, a second subscription dialog for conference information from the content server to the second multipoint control unit;
modifying, by the signaling adapter, the second subscription dialog to appear as if the second subscription dialog is between the first multipoint control unit and the second multipoint control unit;
sending, by the signaling adapter, the modified second subscription dialog to the second multipoint control unit; and
forwarding, by the signaling adapter, responses from the second multipoint control unit in the second subscription dialog to the content server instead of the first multipoint control unit.

5. The conferencing method of claim 1, further comprising:
intercepting, from the content server by the signaling adapter, a dialog termination request; and
responding, by the signaling adapter, to the dialog termination request from the content server instead of forwarding the dialog termination request to the second multipoint control unit.

6. The conferencing method of claim 5, further comprising:
forwarding, from the first multipoint control unit by the signaling adapter, a dialog termination request from the first multipoint control unit to the second multipoint control unit without waiting for a dialog termination request from the content server.

7. The conferencing method of claim 1, further comprising:
intercepting, by the signaling adapter, a first subscription dialog request for conference information from the first multipoint control unit to the second multipoint control unit;
forwarding, by the signaling adapter, the intercepted first subscription dialog request for conference information to the second multipoint control unit;
intercepting, by the signaling adapter, a second subscription dialog request for conference information from the content server to the second multipoint control unit;
dropping, by the signaling adapter, the second subscription dialog request;
intercepting and storing, by the signaling adapter, a conference information response from the second multipoint control unit to the first multipoint control unit;
forwarding, by the signaling adapter, the intercepted conference information response to the first multipoint control unit; and
responding, by the signaling adapter, to the second subscription dialog request with the stored conference information response.

8. A non-transitory machine readable storage medium on which is stored software for connecting endpoints of one type to a conference of another type, comprising instructions that when executed by a signaling adapter, cause the signaling adapter to:
receive, from a first multipoint control unit of a first type, a first request being sent to a second multipoint control unit of a second type to add a participant for a media stream;
send the received first request to the second multipoint control unit;
receive, from a content server, a second request being sent to the second multipoint control unit to add the participant for a content stream
drop the second request;
receive, from the second multipoint control unit, responses to the first request;
send received responses to the first request from the second multipoint control unit to the first multipoint control unit and the content server; and
fork conference notifications to the content server and the first multipoint control unit.

9. The non-transitory machine readable storage medium of claim 8, wherein the instructions further comprise instructions that when executed by the signaling adapter, cause the signaling adapter to:
receive, from the first multipoint control unit, a first session refresh request being sent to the second multipoint control unit;
send the first session refresh request to the second multipoint control unit;
receive a response to the first session refresh request;
send the received response to the first session refresh request to the first multipoint control unit;
store the received response to the first session refresh request;
receive a second session refresh request from the content server;
drop the second session refresh request; and
respond to the second session refresh request with the stored response to the first session refresh request.

10. The non-transitory machine readable storage medium of claim 8, wherein the instructions further comprise instructions that when executed by the signaling adapter, cause the signaling adapter to:
  intercept a first subscription dialog for conference information between the first multipoint control unit and the second multipoint control unit;
  forward the intercepted first subscription dialog for conference information between the first multipoint control unit and the second multipoint control unit;
  intercept a second subscription dialog for conference information from the content server to the second multipoint control unit;
  modify the second subscription dialog to appear as if the second subscription dialog is between the first multipoint control unit and the second multipoint control unit;
  sending the modified second subscription dialog to the second multipoint control unit; and
  forward responses from the second multipoint control unit in the second subscription dialog to the content server instead of the first multipoint control unit.

11. The non-transitory machine readable storage medium of claim 8, wherein the instructions further comprise instructions that when executed by the signaling adapter, cause the signaling adapter to:
  intercept, from the content server, a dialog termination request; and
  respond to the dialog termination request from the content server instead of forwarding the dialog termination request to the second multipoint control unit.

12. The non-transitory machine readable storage medium of claim 11, wherein the instructions further comprise instructions that when executed by the signaling adapter, cause the signaling adapter to:
  forward, from the first multipoint control unit, a dialog termination request to the second multipoint control unit without waiting for a dialog termination request from the content server.

13. The non-transitory machine readable storage medium of claim 8, wherein the instructions further comprise instructions that when executed by the signaling adapter, cause the signaling adapter to:
  intercept a first subscription dialog request for conference information from the first multipoint control unit to the second multipoint control unit;
  forward the intercepted first subscription dialog request for conference information to the second multipoint control unit;
  intercept a second subscription dialog request for conference information from the content server to the second multipoint control unit;
  drop the second subscription dialog request;
  intercept and store a conference information response from the second multipoint control unit to the first multipoint control unit;
  forward the intercepted conference information response to the first multipoint control unit; and
  respond to the second subscription dialog request with the stored conference information response.

14. A signaling adapter for connecting endpoints of one type to a conference of another type, comprising:
  a hardware processing element; and
  software for connecting endpoints of one type to a conference of another type, stored on a memory connected to the hardware processing element, comprising instructions that when executed cause the hardware processing element to:
    receive, from a first multipoint control unit of a first type, a first request being sent to a second multipoint control unit of a second type to add a participant for a media stream;
    send the received first request to the second multipoint control unit;
    receive, from a content server, a second request being sent to the second multipoint control unit to add the participant for a content stream;
    drop the second request, from a content server, to add the participant for a content stream being sent to the second multipoint control unit; and
    send responses to the first request from the second multipoint control unit to the first multipoint control unit and the content server.

15. The signaling adapter of claim 14, wherein the media stream and the content stream originate from a single endpoint of the first type.

16. The signaling adapter of claim 14, wherein the instructions further comprise instructions that when executed by the hardware processing element, cause the hardware processing element to:
  receive, from the first multipoint control unit, a first session refresh request being sent to the second multipoint control unit;
  send the first session refresh request to the second multipoint control unit;
  receive a response to the first session refresh request;
  send the received response to the first session refresh request to the first multipoint control unit;
  store the received response to the first session refresh request;
  receive a second session refresh request from the content server;
  drop the second session refresh request; and
  respond to the second session refresh request with the stored response to the first session refresh request.

17. The signaling adapter of claim 14, wherein the instructions further comprise instructions that when executed by the hardware processing element, cause the hardware processing element to:
  intercept a first subscription dialog for conference information between the first multipoint control unit and the second multipoint control unit;
  forward the intercepted first subscription dialog for conference information between the first multipoint control unit and the second multipoint control unit;
  intercept a second subscription dialog for conference information from the content server to the second multipoint control unit;
  modify the second subscription dialog to appear as if the second subscription dialog is between the first multipoint control unit and the second multipoint control unit;
  sending the modified second subscription dialog to the second multipoint control unit; and
  forward responses from the second multipoint control unit in the second subscription dialog to the content server instead of the first multipoint control unit.

18. The signaling adapter of claim 14, wherein the instructions further comprise instructions that when executed by the hardware processing element, cause the hardware processing element to:

intercept, from the content server, a dialog termination request; and respond to the dialog termination request from the content server instead of forwarding the dialog termination request to the second multipoint control unit.

19. The signaling adapter of claim 18, wherein the instructions further comprise instructions that when executed by the hardware processing element, cause the hardware processing element to:

forward, from the first multipoint control unit, a dialog termination request to the second multipoint control unit without waiting for a dialog termination request from the content server.

20. The signaling adapter of claim 14, wherein the instructions further comprise instructions that when executed by the hardware processing element, cause the hardware processing element to:

intercept a first subscription dialog request for conference information from the first multipoint control unit to the second multipoint control unit;

forward the intercepted first subscription dialog request for conference information to the second multipoint control unit;

intercept a second subscription dialog request for conference information from the content server to the second multipoint control unit;

drop the second subscription dialog request;

intercept and store a conference information response from the second multipoint control unit to the first multipoint control unit;

forward the intercepted conference information response to the first multipoint control unit; and respond to the second subscription dialog request with the stored conference information response.

\* \* \* \* \*